(12) United States Patent
Ye et al.

(10) Patent No.: US 7,010,037 B2
(45) Date of Patent: Mar. 7, 2006

(54) SYSTEM AND METHOD FOR RATE-DISTORTION OPTIMIZED DATA PARTITIONING FOR VIDEO CODING USING BACKWARD ADAPTATION

(75) Inventors: Jong Chul Ye, Croton-on-Hudson, NY (US); Yingwei Chen, Briarcliff Manor, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 429 days.

(21) Appl. No.: 10/295,669

(22) Filed: Nov. 15, 2002

(65) Prior Publication Data

US 2004/0028131 A1 Feb. 12, 2004

Related U.S. Application Data

(60) Provisional application No. 60/401,300, filed on Aug. 6, 2002.

(51) Int. Cl.
*H04N 7/18* (2006.01)

(52) U.S. Cl. .................. 375/240.1; 375/240.11
(58) Field of Classification Search ............... 375/240.01–240.29
See application file for complete search history.

(56) References Cited

U.S. PATENT DOCUMENTS

| | | | |
|---|---|---|---|
| 6,037,987 A | * | 3/2000 | Sethuraman .......... 375/240.03 |
| 2003/0099298 A1 | * | 5/2003 | Rose et al. ........... 375/240.27 |
| 2003/0113027 A1 | * | 6/2003 | Chan et al. ................ 382/240 |

OTHER PUBLICATIONS

Martini et al., "Proportional Unequal Error Protection for MPEG-4 Video Transmission", IEEE 2001, IEEE International Conference on Communications, Helsinmki, Finland, Jun. 2001, Conference Record, vol. 4, pp. 1033-1037.

* cited by examiner

*Primary Examiner*—Andy Rao

(57) ABSTRACT

A system and method are disclosed that provide a simple and efficient layered video coding technique using a backward adaptive rate-distortion optimized data partitioning (RD-DP) of DCT coefficients. The video coding system may include an rate-distortion optimized data partitioning encoder and decoder. The RD-DP encoder adapts the partition point block-by-block which greatly improves the coding efficiency of the base layer bit stream without explicit transmission thereby saving the bandwidth significantly. The RD-DP decoder can also find the partition location in backward-fashion from the decoded data.

29 Claims, 4 Drawing Sheets

SYSTEM AND METHOD FOR RATE-DISTORTION OPTIMIZED DATA PARTITIONING FOR VIDEO CODING USING BACKWARD ADAPTATION

CROSS REFERENCE TO RELATED APPLICATIONS

This application claims the benefit of U.S. Provisional Application Ser. No. 60/401,300 filed Aug. 6, 2002, the teachings of which are incorporated herein by reference.

BACKGROUND OF THE INVENTION

1. Field of the Invention

The present invention is related to scalable video coding systems, in particular, the invention relates to an efficient layered video coding technique using backward adaptive rate-distortion optimized data partitioning (RD-DP) of discrete cosine transform (DCT) coefficients. The invention has particular utility in connection with variable-bandwidth networks and computer systems that are able to accommodate different bit rates, and hence different quality images.

2. Description of the Related Art

Video is a sequence of pictures; each picture is formed by an array of pixels. The size of uncompressed video is huge. To reduce its size, video compression may be used to reduce the size and improve the data transmission rate. Various video coding methods (e.g., MPEG 1, MPEG 2, and MPEG 4) have been established to provide an international standard for the coded representation of moving pictures and associated audio on digital storage media.

Such video coding methods format and compress the raw video data for reduced rate transmission. For example, the format of the MPEG 2 standard consists of 4 layers: Group of Pictures, Pictures, Slice, Macroblock, Block. A video sequence begins with a sequence header that includes one or more groups of pictures (GOP), and ends with an end-of-sequence code. The Group of Pictures (GOP) includes a header and a series of one of more pictures intended to allow random access into the video sequence.

The pictures are the primary coding unit of a video sequence. A picture consists of three rectangular matrices representing luminance (Y) and two chrominance (Cb and Cr) values. The Y matrix has an even number of rows and columns. The Cb and Cr matrices are one-half the size of the Y matrix in each direction (horizontal and vertical). The slices are one or more "contiguous" macroblocks. The order of the macroblocks within a slice is from left-to-right and top-to-bottom.

The macroblocks are the basic coding unit in the MPEG algorithm. The macroblock is a 16×16 pixel segment in a frame. Since each chrominance component has one-half the vertical and horizontal resolution of the luminance component, a macroblock consists of four Y, one Cr, and one Cb block. The Block is the smallest coding unit in the MPEG algorithm. It consists of 8×8 pixels and can be one of three types: luminance(Y), red chrominance(Cr), or blue chrominance(Cb). The block is the basic unit in intra frame coding.

The MPEG 2 standard defines three types of pictures: Intra Pictures (I-Pictures) Predicted Pictures (P-Pictures); and Bidirectional Pictures (B-Pictures). Intra pictures, or I-Picture, are coded using only information present in the picture itself, and provides potential random access points into the compressed video data. Predicted pictures, or P-pictures, are coded with respect to the nearest previous I- or P-pictures. Like I-pictures, P-pictures also can serve as a prediction reference for B-pictures and future P-pictures. Moreover, P-pictures use motion compensation to provide more compression than is possible with I-pictures. Bidirectional pictures, or B-pictures, are pictures that use both a past and future picture as a reference. B-pictures provide the most compression since it uses the past and future picture as a reference. These three types of pictures are combined to form a group of picture.

The MPEG transform coding algorithm includes the following coding steps: Discrete cosine transform (DCT), Quantization and Run-length encoding An important technique in video coding is scalability. In this regard, a scalable video codec is defined as a codec that is capable of producing a bitstream that can be divided into embedded subsets. These subsets can be independently decoded to provide video sequences of increasing quality. Thus, a single compression operation can produce bitstreams with different rates and reconstructed quality. A small subset of the original bitstream can be initially transmitted to provide a base layer quality with extra layers subsequently transmitted as enhancement layers. Scalability is supported by most of the video compression standards such as MPEG-2, MPEG-4 and H.263.

An important application of scalability is in error resilient video transmission. Scalability can be used to apply stronger error protection to the base layer than to the enhancement layers (i.e., unequal error protection). Thus, the base layer will be successfully decoded with high probability even during adverse transmission channel conditions.

Data Partitioning (DP) is used to facilitate scalability. For example in MPEG 2, the slice layer indicates the maximum number of block transform coefficients contained in the particular bitstream (known as the priority break point). Data partitioning is a frequency domain method that breaks the block of 64 quantized transform coefficients into two bitstreams. The first, higher priority bitstream (e.g., base layer) contains the more critical lower frequency coefficients and side information (such as DC values, motion vectors). The second, lower priority bitstream (e.g., enhancement layers) carries higher frequency AC data.

In particular, in conventional DP video coders (e.g., MPEG ), single layer bit stream is partitioned into two or more bit streams in the DCT domain. During transmission, one or more bit streams are sent to achieve bit rate scalability. Unequal error protection can be applied to base and enhancement layer data to improve robustness to channel degradation. Before decoding, depending on resource allocation and/or receiver capacity, the received bitstreams or a subset of them are merged into one single bitstream and decoded.

The conventional DP structure has advantages in a home network environment. More specifically, at its full quality, the rate-distortion performance of the DP is as good as its single layer counterpart while rate scalability is also allowed. The rate-distortion (R-D) performance is concerned with finding an optimal combination of rate and distortion. This optimal combination, which could also be seen as the optimal combination of cost and quality, is not unique. R-D schemes attempt to represent a piece of information with the fewest bits possible and at the same time in a way that will lead to the best reproduction quality.

It is also noted that in the conventional DP structure, the additional decoding complexity overhead is very minimal at its full quality while the DP provides wider range of decoder complexity scalability. This is because variable length decoding (VLD) of DCT run-length pairs—which is the most computational extensive part—now becomes scalable.

In the conventional DP structure, the DCT priority break point (PBP) value needs to be transmitted explicitly as side information. To minimize the overhead, the PBP value is usually fixed for all the DCT blocks within each slice or video packet.

While the conventional DP method is simple and has some advantages, it is not capable of adapting base layer optimization because only one PBP value is used for all blocks within each slice or video packets. Accordingly, there exists a need for video coding techniques adaptable to provide improved base layer optimization.

SUMMARY OF THE INVENTION

The present invention addresses the foregoing need by providing an improved data partitioning technique by allowing the PBP value to adapt each at DCT block level. In one embodiment of the present invention, this can be achieved with minimal overhead ($\approx$20 bits for each slice or video packet or even for each frame) by employing context-based backward adaptation.

One aspect of the present invention is directed to a system and method that provide a backward adaptive rate-distortion optimized data partitioning (RD-DP) of DCT coefficients.

In another aspect of the present invention, the RD-DP adapts the partition point block-by-block, hence greatly improves the coding efficiency of the base layer bit stream. This also allows a decoder to find the partition location in backward-fashion from the decoded data without explicit transmission, hence saving the bandwidth significantly.

In yet another aspect of the present invention, a Lagrangian parameter $\lambda$ is calculated. The value of $\lambda$ is determined to meet the rate budget Rb (for the base layer transmission channel) using a standard one-dimensional bisection algorithm.

On embodiment of the present invention is directed to a data partitioning method for a scalable video encoder. The method includes the steps of receiving video data, determining DCT coefficients for a plurality of macroblocks of a video frame, quantizing the DCT coefficients and converting the quantized DCT coefficients into (run, length) pairs. For each the plurality of macroblocks in the video frame, determining a ratio $|X_i^k|^2/L_i^k{}^2$, where a k-th (run, length) pair for an i-th block is $L_i^k$ bits and has a coefficient value of $X_i^k$. If a k-th ratio for the k-th (run, length) pair is less than $\lambda$ or if the k-th ratio is a first ratio that is not less than $\lambda$, putting the k-th (run, length) pair into a base layer, otherwise if the k-th ratio for the k-th (run, length) pair is greater than $\lambda$, putting the k-th (run, length) pair into an enhancement layer, where $\lambda$ is determined in accordance with a Lagrangian calculation.

Another embodiment of the present invention is directed to a method for determining a boundary between a base layer and at least one enhancement layer in a scalable video decoder. The method includes the steps of receiving the base layer and the at least one enhancement layer, the base layer and enhancement layer including data representing (run, length) pairs for a plurality of macroblocks in a video frame. For each the plurality of macroblocks in the video frame, determining a ratio $|X_i^k|^2/L_i^k$, where a k-th (run, length) pair for an i-th block is $L_i^k$ bits and has a coefficient value of $X_i^k$. If the ratio for the k-th (run, length) pair is less than $\lambda$ or if the k-th ratio is a first ratio that is not less than $\lambda$, read the k-th (run, length) pair from the base layer, otherwise if the ratio for the k-th (run, length) pair is greater than $\lambda$, read the k-th (run, length) pair from the at least one enhancement layer, where $\lambda$ is determined in accordance with a Lagrangian calculation.

Yet another embodiment of the present invention is directed to a scalable decoder capable of merging data from a base layer and at least one enhancement layer. The decoder includes a memory which stores computer-executable process steps, and a processor which executes the process steps stored in the memory so as (i) receiving the base layer and the at least one enhancement layer, the base layer and enhancement layer including data representing (run, length) pairs for a plurality of macroblocks in a video frame, (2) for each the plurality of macroblocks in the video frame, determining a ratio $|X_i^k|^2/L_i^k$, where a k-th (run, length) pair for an i-th block is $L_i^k$ bits and has a coefficient value of $X_i^k$, and (3) if the ratio for the k-th (run, length) pair is less than $\lambda$ or if the k-th ratio is a first ratio that is not less than $\lambda$, read the k-th (run, length) pair from the base layer, otherwise if the ratio for the k-th (run, length) pair is greater than $\lambda$, read the k-th (run, length) pair from the at least one enhancement layer, where $\lambda$ is determined in accordance with a Lagrangian calculation.

Yet another embodiment of the present invention is directed to a scalable transcoder. A single layer coded video bitstream (MPEG-1, MPEG-2, MPEG-4, H.264, etc) is partially decoded and the bitstream splitting point is determined for each DCT block based on the forementioned boundary determining method embodiment. Afterwards the VLC codes are split into two or more partitions based on the splitting points. The partial decoding involves variable length decoding, inverse scanning and inverse quantization only. No inverse DCT or motion compensation is needed.

This brief summary has been provided so that the nature of the invention may be understood quickly. A more complete understanding of the invention can be obtained by reference to the following detailed description of the preferred embodiments thereof in connection with the attached drawings.

DETAILED DESCRIPTION OF THE PREFERRED EMBODIMENTS

Figure 1:
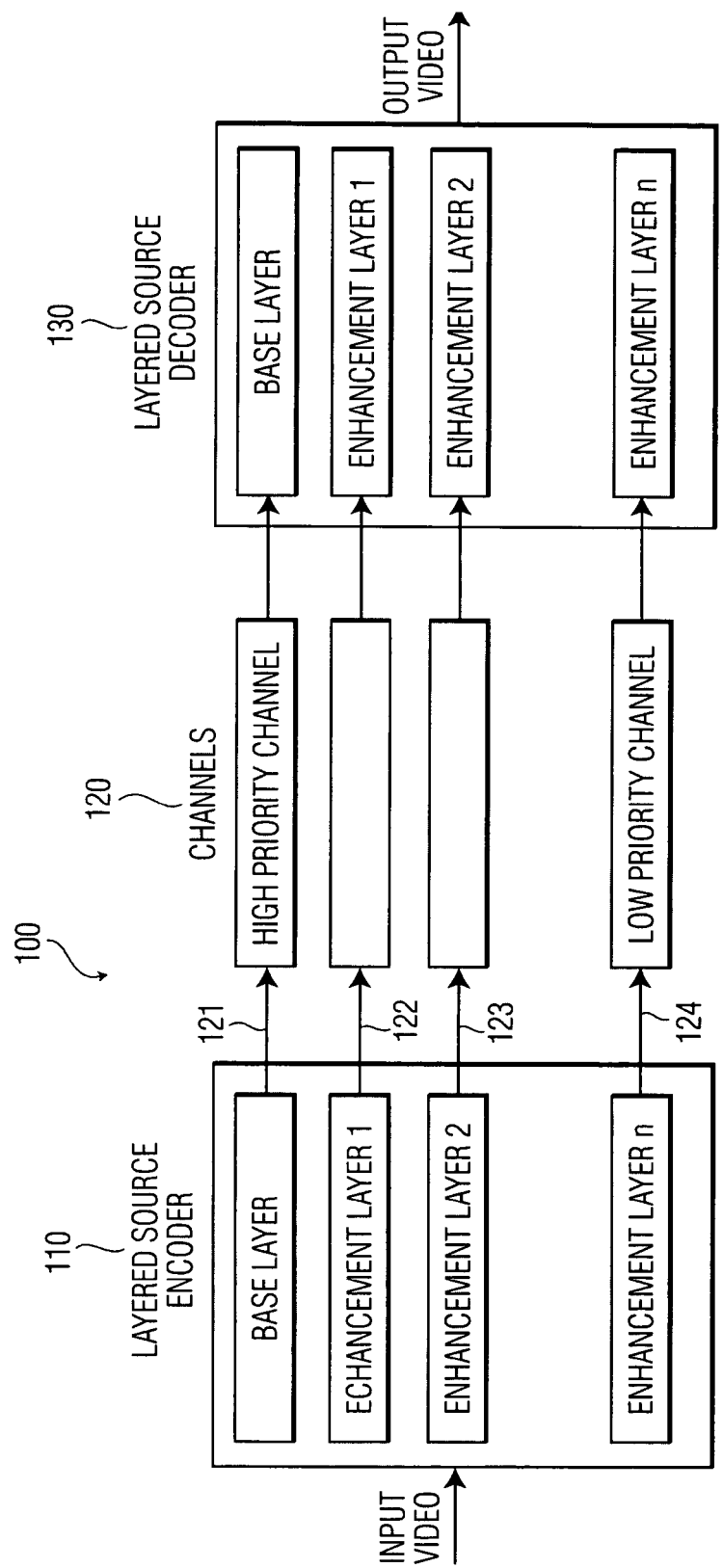
FIG. 1 depicts a video coding system in accordance with one aspect of the present invention.

FIG. 1 illustrates a scalable video system 100 with layered coding and transport prioritization. A layered source encoder 110 encodes input video data. The output of the layered source encoder 110 includes a base layer 121 and one or more enhancement layers 122–124. A plurality of channels 120 carry the output encoded data. A layered source decoder 130 decodes the encoded data.

There are different ways of implementing layered coding. For example, in temporal domain layered coding, the base layer contains a bit stream with a lower frame rate and the enhancement layers contain incremental information to obtain an output with higher frame rates. In spatial domain layered coding, the base layer codes the sub-sampled version of the original video sequence and the enhancement layers contain additional information for obtaining higher spatial resolution at the decoder.

Generally, a different layer uses a different data stream and has distinctly different tolerances to channel errors. To combat channel errors, layered coding is usually combined with transport prioritization so that the base layer is delivered with a higher degree of error protection. If the base layer 121 is lost, the data contained in the enhancement layers 122–124 may be useless.

In one embodiment of the present invention, the video quality of the base layer 121 is flexibly controlled at the DCT block level. The desired base layer can be controlled by adapting the PBP at the DCT block level by employing context-based backward adaptation.

It is noted that the purpose of DCT is to reduce the spatial correlation between adjacent error pixels, and to compact the energy of the error pixels into a few coefficients. Because many high frequency coefficients are zero after quantization, variable length coding (VLC) is accomplished by a run-length coding method, which orders the coefficients into a one-dimensional array using a so-called zig-zag scan so that the low-frequency coefficients are put in front of the high-frequency coefficients. This way, the quantized coefficients are specified in terms of the non-zero values and the number of the preceding zeros. Different symbols, each corresponding to a pair of zero runlength, and non-zero value, are coded using variable length codewords.

The scalable video system 100 preferably uses entropy coding. In entropy coding, quantized DCT coefficients are rearranged into a one-dimensional array by scanning them in a zig-zag order. This rearrangement puts the DC coefficient at the first location of the array and the remaining AC coefficients are arranged from the low to high frequency, in both the horizontal and vertical directions. The assumption is that the quantized DCT coefficients at higher frequencies would likely be zero, thereby separating the non-zero and zero parts. The rearranged array is coded into a sequence of the run-level pair. The run is defined as the distance between two non-zero coefficients in the array. The level is the non-zero value immediately following a sequence of zeros. This coding method produces a compact representation of the 8×8 DCT coefficients, since a large number of the coefficients have been already quantized to zero value.

The run-level pairs and the information about the macroblock, such as the motion vectors, and prediction types, are further compressed using entropy coding. Both variable-length and fixed-length codes are used for this purpose.

The design of the video system 100 is motivated by the operational rate-distortion (RD) theory. RD theory is useful in coding and compression scenarios, where the available bandwidth is known a priori and where the purpose is to achieve the best reproduction quality that can be achieved within this bandwidth (i.e., adaptive algorithms).

Discussed below is an illustration formulated to solve for the optimized partitions (i.e., base and enhancement layer partitions). In the following discussion it is assumed that there are "n" DCT blocks for each video frame and the bit rate budget Rb is known for the base layer partition. The rate budget is determined based on the minimal video quality requirement and channel throughput fluctuation. Then, the following optimization problem can be formulated to solve for the optimal partitions:

$$\min_{P1,\cdots,Pn} \sum_{i=1}^{n} Di(Pi) \text{ subject to } \sum_{i=1}^{n} Ri(Pi) \le Rb \qquad (1)$$

where $Pi \in \{0,1,\ldots,K(i)\}$, $i=1,\ldots,n$ is the break point value for the i-th block and $K(i)$ denotes the maximum (run, length) pairs in the i-th block, $Ri(Pi)$ and $Di(Pi)$ denote the corresponding bit rate and the distortion from the i-th block, respectively.

The optimization problem can be solved using an iterative bisection algorithm based on a Lagrangian optimization. The optimal partitioning point Pi satisfies the following condition for all $i=1,\ldots,n$:

$$\frac{\partial Di(Pi)}{\partial Ri(Pi)} + \lambda = 0, i=1,\ldots,n \qquad (2)$$

where the Lagrangian $\lambda>0$ is determined by the standard bisection search so that the rate constraint in (1) is satisfied.

If the k-th DCT (run, length) pair for the i-th block is $L_i^k$ bits and has a coefficient value of $X_i^k$; then, the slope for the rate-distortion (R-D) curve of the i-th block has the following set of discrete values:

$$\frac{\partial Di(Pi)}{\partial Ri(Pi)} = \frac{Di(P_{i+1}) - Di(Pi)}{Ri(P_{i+1}) - Ri(Pi)} \in \left\{ \frac{|X_i^k|^2}{L_i^k} \right\}_{k=1}^{K(i)} \qquad (3)$$

Figure 2:
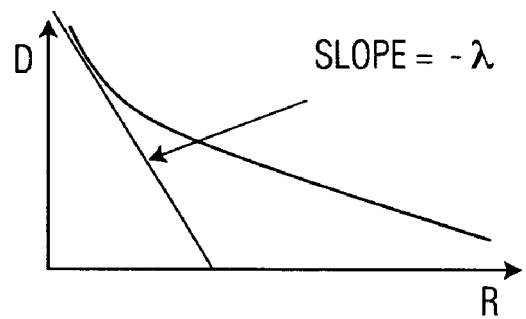
FIG. 2 depicts a Rate-Distortion curve.

Referring now to FIG. 2, a convex R-D curve is shown to illustrate how to determine the partition point and how the layered source decoder 130 can infer the partition point in a backward-adaptive fashion. It is noted that the layered source decoder 130 operates in the same way even if R-D curse is not convex.

From FIG. 2, it can seen that in general $\lambda$ is decreasing function with respect to R and therefore, in general, the following relationship holds:

$$\frac{|X_i^1|^2}{L_i^1} \ge \frac{|X_i^2|^2}{L_i^2} \ge \ldots \ge \frac{|X_i^{K(i)}|^2}{L_i^{K(i)}} \qquad (4)$$

In accordance with Eq. (4) a partitioning algorithm for the DCT coefficients at the layered source encoder 110 side is given below. It is noted that to get to this point, the video data for a frame is converting it using the discrete cosine transform (DCT), the DCT coefficients are quantized, and then converted into binary codewords (run, length) using variable length coding (VLC).

---

```
for i=1,...,n   { for each macroblock in frame
    for k=1,...,K(i)   { for each (run, length) pair
        Compute the corresponding X_i^k,L_i^k.
        Put the k-th (run, length) VLC
            into base layer.
        if | X_i^k |² / L_i^k < λ break;
    }
```

-continued

```
        put the remaining (run, length) pairs of i-th block
        into ENH layer.
}
```

The Lagrangian parameter λ may be separately encoded and transmitted as side information (i.e., overhead information). The layered source decoder 130 can find the boundary of the base layer 121 and enhancement layer 122, as well as, find the synchronization using the following algorithm:

```
for i=1,...,n    { for each macroblock in frame
    for k=1,...,K(i)    { for each (run, length)pair
        Read VLC (run, length) pair from
        base layer.
        Compute the corresponding  X_i^k,L_i^k .
        if | X_i^k | ² /L_i^k <λ break;
    }
    Read the remaining (run, length) pairs of I-th
    block from ENH layer.
}
```

In practical implementation of variable length coding for the (run, length) pair, the R-D curve of FIG. 2 may be non-convex because the VLC is only an approximation of the true entropy of the source. In that case, the test variable $|X_i^k|^2/L_i^k$ is no more monotonic with respect to k. However, even in this case, it can be seen that the encoding and decoding algorithms can be perfectly synchronized since both break after the first (run, length) pairs that satisfies $|X_i^k|^2/L_i^k<\lambda$.

As discussed above, the only side information to be transmitted is the Lagrangian parameter λ. The value of λ is determined to meet the rate budget Rb of Eq.(1) using a standard one-dimensional bisection algorithm. However, the optimal value of λ can be a real number and should be quantized for transmission over the channel 120.

In a preferred embodiment, the encoding precision of the quantized λ is determined as follows. The encoding precision is resolved by understanding that $|X_i^k|^2/L_i^2$ has only discrete values for all i,k. For example, the maximum size of $L_i^k$ is upper bounded by the maximum length of the codeword in the Huffman table, while the maximum value of $|X_i^k|$ is upper bounded by the DCT coefficient range. More specifically, the required bits to encode $L_i^k$ and $|X_i^k|$ are upper bounded by $\log_{base2}$(maximum length of codeword in Huffman table) and $\log_{base2}$(DCT coefficient range), respectively.

For example, if the maximum length VLC is 64 bits long, and DCT coefficients are integer number between −2048 and 2047, then the value of λ can be quantized with $\log_{base2}$(64)+$\log_{base2}$(2048)=19 bits. Since this overhead needs to be sent only once at the vide frame header, it can be seen that the increase of the bit rate using the RD-DP is minimal. One of ordinary skill in the art will also understand that the λ value overhead may also be sent at the slice or video packet level to combat frame header losses.

Thus, by transmitting the λ value and the corresponding low frequency and some high frequency DCT coefficients (as the base layer 121) over a more reliable transmission channel, greater dynamic allocation of the DCT information is achievable. This allows for more control of the minimal quality of the video in case data from one or more of the enhancement layers 122–124 is lost.

The embodiments of the present invention discussed above are applicable to any scalable video coding system, e.g., MPEG 2, MPEG 4, H.263, etc.

Figure 3:
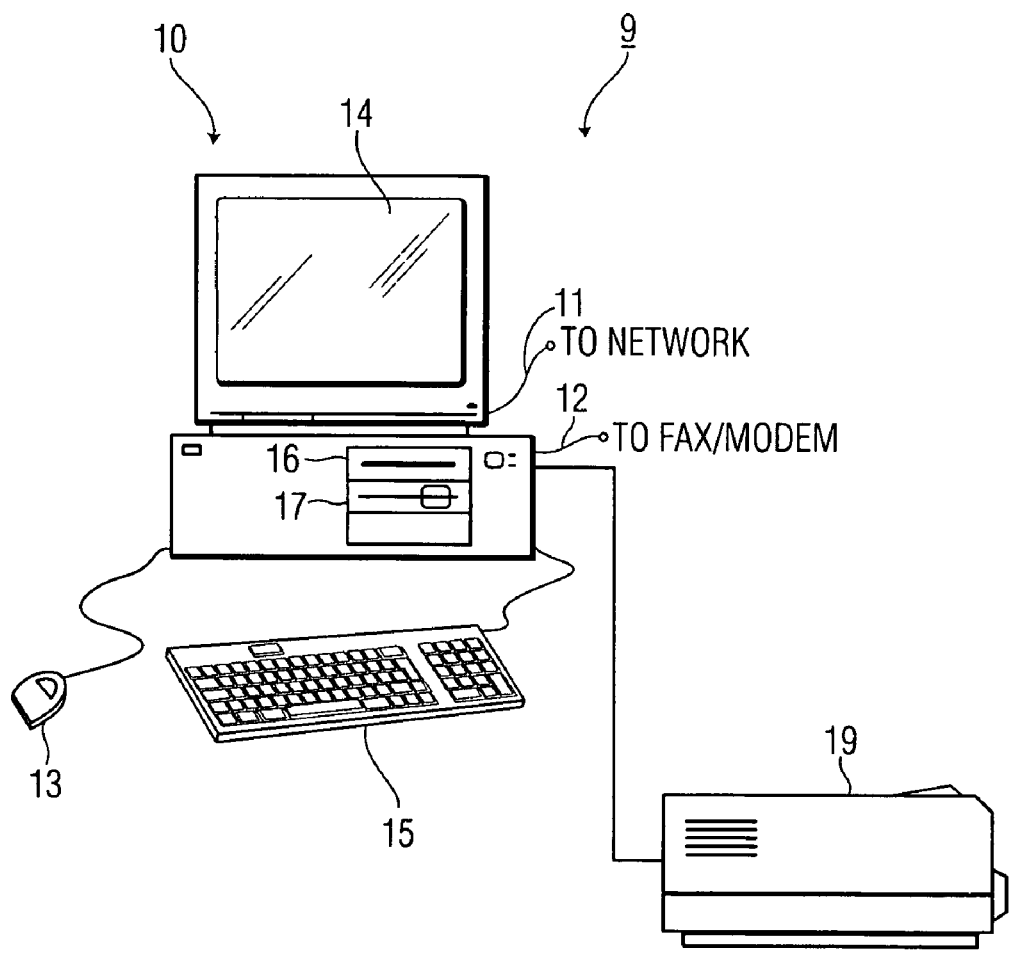
FIG. 3 depicts a computer system on which the present invention may be implemented.

FIG. 3 shows a representative embodiment of a computer system 9 on which the present invention may be implemented. As shown in FIG. 3, personal computer ("PC") 10 includes network connection 11 for interfacing to a network, such as a variable-bandwidth network or the Internet, and fax/modem connection 12 for interfacing with other remote sources such as a video camera (not shown). PC 10 also includes display screen 14 for displaying information (including video data) to a user, keyboard 15 for inputting text and user commands, mouse 13 for positioning a cursor on display screen 14 and for inputting user commands, disk drive 16 for reading from and writing to floppy disks installed therein, and CD-ROM drive 17 for accessing information stored on CD-ROM. PC 10 may also have one or more peripheral devices attached thereto, such as a scanner (not shown) for inputting document text images, graphics images, or the like, and printer 19 for outputting images, text, or the like.

Figure 4:
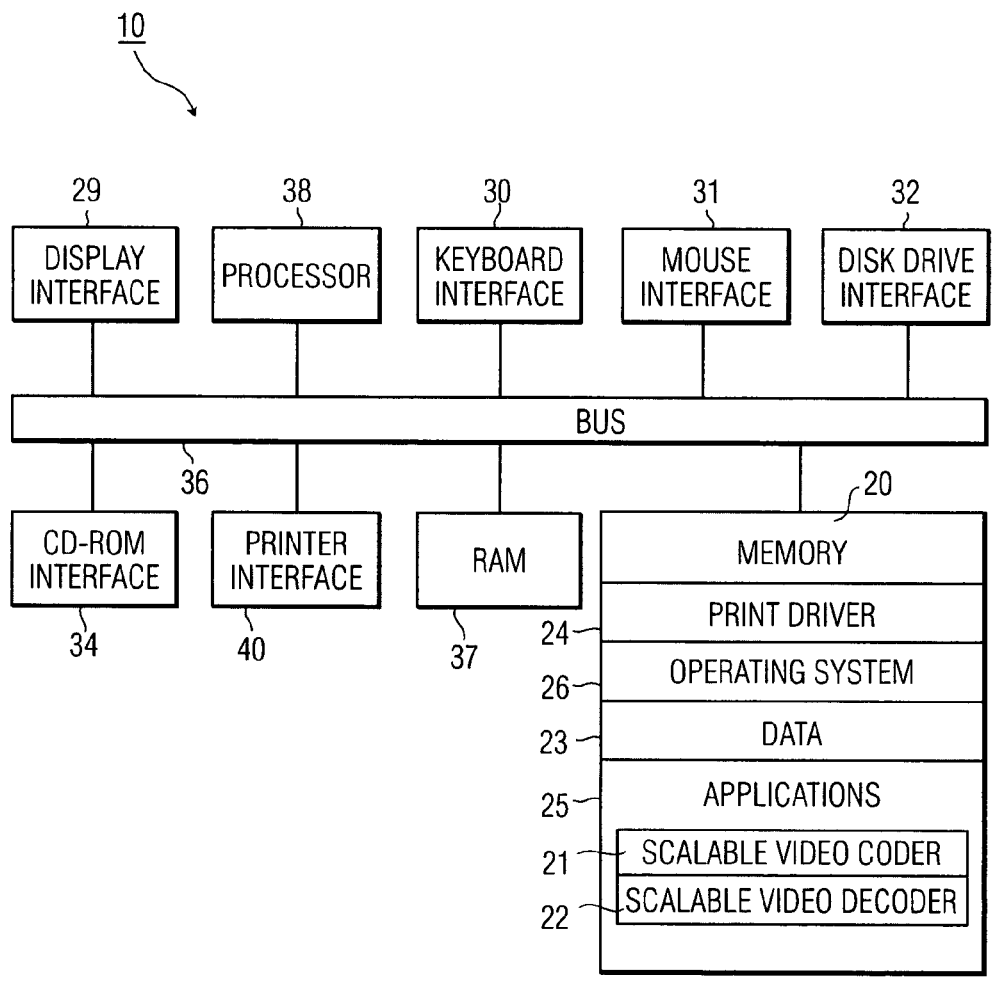
FIG. 4 depicts the architecture of a personal computer in the computer system shown in FIG. 3.

FIG. 4 shows the internal structure of PC 10. As shown in FIG. 4, PC 10 includes memory 20, which comprises a computer-readable medium such as a computer hard disk. Memory 20 stores data 23, applications 25, print driver 24, and operating system 26. In preferred embodiments of the invention, operating system 26 is a windowing operating system, such as Microsoft Windows95; although the invention may be used with other operating systems as well. Among the applications stored in memory 20 are scalable video coder 21 and scalable video decoder 22. Scalable video coder 21 performs scalable video data encoding in the manner set forth in detail below, and scalable video decoder 22 decodes video data that has been coded in the manner prescribed by scalable video coder 21.

Also included in PC 10 are display interface 29, keyboard interface 30, mouse interface 31, disk drive interface 32, CD-ROM drive interface 34, computer bus 36, RAM 37, processor 38, and printer interface 40. Processor 38 preferably comprises a microprocessor or the like for executing applications, such those noted above, out of RAM 37. Such applications, including scalable video coder 21 and scalable video decoder 22, may be stored in memory 20 (as noted above) or, alternatively, on a floppy disk in disk drive 16 or a CD-ROM in CD-ROM drive 17. Processor 38 accesses applications (or other data) stored on a floppy disk via disk drive interface 32 and accesses applications (or other data) stored on a CD-ROM via CD-ROM drive interface 34.

Application execution and other tasks of PC 4 may be initiated using keyboard 15 or mouse 13, commands from which are transmitted to processor 38 via keyboard interface 30 and mouse interface 31, respectively. Output results from applications running on PC 10 may be processed by display interface 29 and then displayed to a user on display 14 or, alternatively, output via network connection 11. For example, input video data which has been coded by scalable video coder 21 is typically output via network connection 11. On the other hand, coded video data received from, e.g., a variable bandwidth-network is decoded by scalable video decoder 22 and then displayed on display 14. To this end, display interface 29 preferably comprises a display processor for forming video images based on decoded video data provided by processor 38 over computer bus 36, and for outputting those images to display 14. Output results from other applications, such as word processing programs, running on PC 10 may be provided to printer 19 via printer interface 40. Processor 38 executes print driver 24 so as to perform appropriate formatting of such print jobs prior to their transmission to printer 19.

Figure 5:
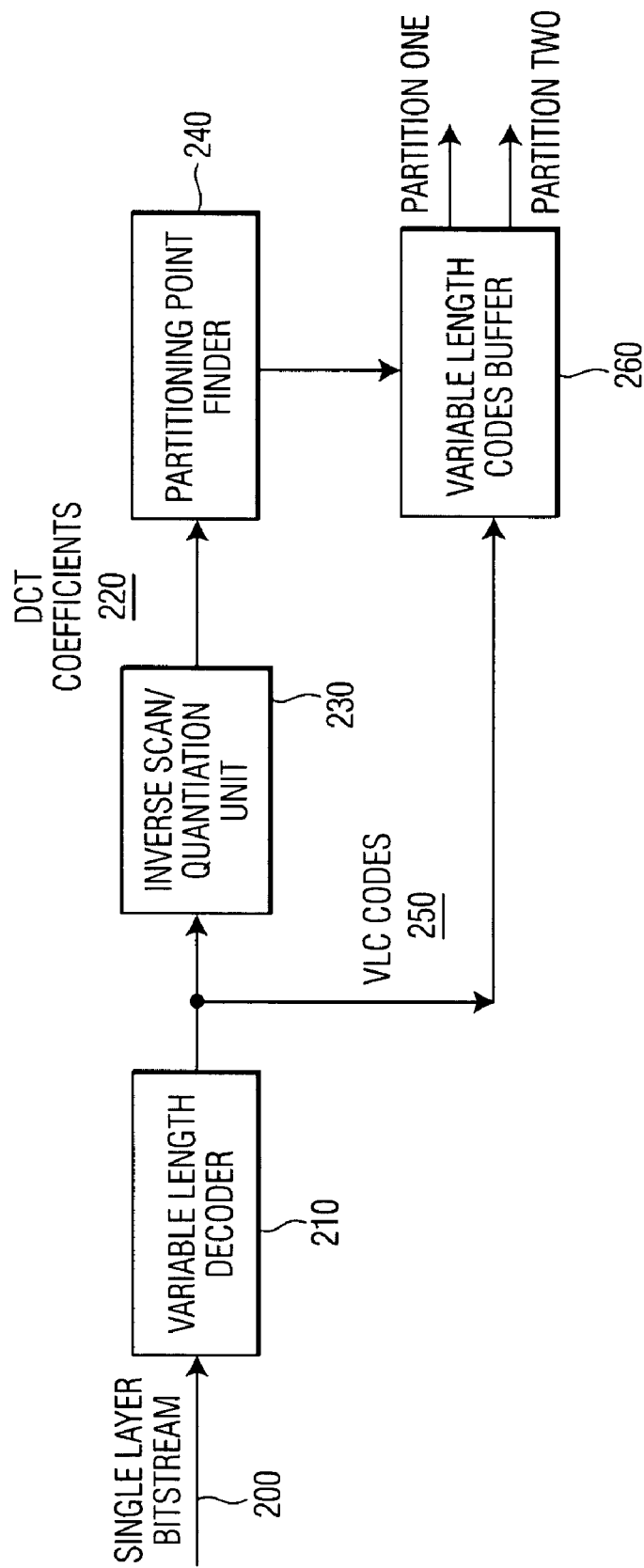
FIG. 5 depicts a block diagram of a transcoder in accordance with one embodiment of the present invention.

Another embodiment of the present invention is directed to a scalable transcoder. As shown in FIG. 5, a single layer coded video bitstream 200 (MPEG-1, MPEG-2, MPEG-4, H.264, etc) is partially decoded by a variable length decoder 210. The DCT coefficient 220 are sent to an inverse scan/quantiation unit 230 and then to a partitioning point finder 240. The bitstream splitting point is determined for each DCT block based on the boundary determining method embodiment discussed above. Afterwards VLC codes 250 are split into two or more partitions based on the splitting points. The results are provided to a variable length code buffer 260. In accordance with the embodiment, the partial decoding involves variable length decoding, inverse scanning and inverse quantization only. No inverse DCT or motion compensation is needed Although the embodiments of the invention described herein are preferably implemented as computer code, all or some of the embodiments discussed above can be implemented using discrete hardware elements and/or logic circuits. Also, while the encoding and decoding techniques of the present invention have been described in a PC environment, these techniques can be used in any type of video devices including, but not limited to, digital televisions/settop boxes, video conferencing equipment, and the like.

In this regard, the present invention has been described with respect to particular illustrative embodiments. For example, principles of the present invention as described in the embodiments above may also be applied to partition enhancement layers. It is to be understood that the invention is not limited to the above-described embodiments and modifications thereto, and that various changes and modifications may be made by those of ordinary skill in the art without departing from the spirit and scope of the appended claims.

What is claimed is:

1. A data partitioning method for a scalable video encoder, the comprising the steps of: receiving video data; determining DCT coefficients for a plurality of macroblocks of a video frame; quantizing the DCT coefficients; converting the quantized DCT coefficients into (run, length) pairs; and for each the plurality of macroblocks in the video frame, determining a ratio $|X_i^k|^2/L_i^2$, where a k-th (run, length) pair for an i-th block is $L_i^k$ bits and has a coefficient value of $X_i^k$; and if a k-th ratio for the k-th (run, length) pair is less than $\lambda$ or if the k-th ratio is a first ratio that is not less than $\lambda$, putting the k-th (run, length) pair into a base layer, otherwise if the k-th ratio for the k-th (run, length) pair is greater than $\lambda$, putting the k-th (run, length) pair into an enhancement layer, where $\lambda$ is determined in accordance with a Lagrangian calculation.

2. The method according to claim 1, further comprising the step of transmitting the base and enhancement layers over different transmission channels.

3. The method according to claim 1, wherein scalable video encoder is an MPEG 4 encoder.

4. The method according to claim 1, wherein scalable video encoder is an H.263 encoder.

5. The method according to claim 1, wherein scalable video encoder is an MPEG 2 encoder.

6. The method according to claim 1, wherein scalable video encoder is a video encoder which has DCT transform and entropy coding.

7. The method according to claim 1, wherein scalable video encoder is realized by transcoding single layer MPEG2, MPEG4, and H.26L.

8. The method according to claim 1, further comprising the step of quantizing .lambda. and transmitting the quantized value as side information to a decoder.

9. The method according to claim 6, wherein the quantized value is a discrete value depending on a DCT dynamic range and a VLC table.

10. The method according to claim 6, wherein the quantized value is a discrete value with user defined precision.

11. The method according to claim 6, wherein the side information is sent only once in a frame header for the video frame.

12. The method according to claim 6, wherein the side information can be sent to a slice header or a video packet header to improve robustness.

13. The method according to claim 1, wherein $\lambda$ is determined to meet a rate budge for a transmission channel for the base layer using a bisection algorithm.

14. The method according to claim 1, wherein $\lambda$ is determined to meet a rate budge for a transmission channel for the base layer using an adaptive algorithm.

15. A method for determining a boundary between a base layer and at least one enhancement layer in a scalable video decoder, the comprising the steps of: receiving the base layer and the at least one enhancement layer, the base layer and enhancement layer including data representing (run, length) pairs for a plurality of macroblocks in a video frame; for each the plurality of macroblocks in the video frame, determining a ratio $|X_i^k|^2/L_i^2$, where a k-th (run, length) pair for an i-th block is $L_i^k$ bits and has a coefficient value of $X_i^k$; and if the ratio for the k-th (run, length) pair is less than .lambda. or if the k-th ratio is a first ratio that is not less than $\lambda$, read the k-th (run, length) pair from the base layer, otherwise if the ratio for the k-th (run, length) pair is greater than $\lambda$, read the k-th (run, length) pair from the at least one enhancement layer, where $\lambda$ is determined by decoding side information.

16. The method according to claim 15, further comprising the step of receiving the base layer and enhancement layer over different transmission channels.

17. The method according to claim 15, wherein scalable video decoder in an MPEG 4 decoder.

18. The method according to claim 15, wherein scalable video decoder in an H.263 decoder.

19. The method according to claim 15, wherein scalable video decoder in an MPEG 2 decoder.

20. The method according to claim 15, wherein scalable video decoder in a video decoder that uses DCT and entropy coding.

21. The method according to claim 15, wherein scalable video decoder is realized by a merger in front of a single layer video decoder selected from the group consisting of an MPEG2, MPEG4, and H.26L decoder.

22. The method according to claim 15, further comprising the step of receiving .lambda. as side information associated with the video frame.

23. The method according to claim 22, wherein the side information is a discrete number which can be encoded with minimal bit overhead.

24. The method according to claim 22, wherein the side information is sent only once in a frame header for the video frame.

25. The method according to claim 22, wherein the side information is copied for each slice header or video packet header to increase robustness.

26. The method according to claim 15, wherein $\lambda$ is determined to meet a rate budge for a transmission channel for the base layer.

27. A scalable decoder capable of merging data from a base layer and at least one enhancement layer, the apparatus comprising: a memory which stores computer-executable process steps; and a processor which executes the process steps stored in the memory so as (i) receiving the base layer and the at least one enhancement layer, the base layer and enhancement layer including data representing (run, length) pairs for a plurality of macroblocks in a video frame, and (2) for each the plurality of macroblocks in the video frame, determining a ratio $|X_i^k|^2/L_i^2$, where a k-th (run, length) pair for an i-th block is $L_i^k$ bits and has a coefficient value of $X_i^k$, and (3) if the ratio for the k-th (run, length) pair is less than $\lambda$ or if the k-th ratio is a first ratio that is not less than $\lambda$, read the k-th (run, length) pair from the base layer, otherwise if the ratio for the k-th (run, length) pair is greater than $\lambda$, read the k-th (run, length) pair from the at least one enhancement layer, where $\lambda$ is determined in accordance with a Lagrangian calculation.

28. The decoder according to claim 27, wherein $\lambda$ is received by the decoder as side information associated with the video frame and the side information is sent only once in a frame header for the video frame.

29. The decoder according to claim 27, wherein $\lambda$ is determined to meet a rate budge for a transmission channel for the base layer.

* * * * *